US007759898B2

(12) United States Patent
Brotto

(10) Patent No.: US 7,759,898 B2
(45) Date of Patent: Jul. 20, 2010

(54) BATTERY PACK LOCKOUT ARRANGEMENT FOR CORDLESS POWER TOOLS

(75) Inventor: Daniele C. Brotto, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 118 days.

(21) Appl. No.: 11/563,969

(22) Filed: Nov. 28, 2006

(65) Prior Publication Data

US 2008/0122404 A1 May 29, 2008

(51) Int. Cl.
*H02J 7/00* (2006.01)

(52) U.S. Cl. ........................ 320/114; 320/112; 320/135

(58) Field of Classification Search ................. 320/114, 320/112, 135; 324/426
See application file for complete search history.

(56) References Cited

U.S. PATENT DOCUMENTS 6,525,511 B2 2/2003 Kubale et al.
2006/0087285 A1 4/2006 Phillips

FOREIGN PATENT DOCUMENTS

DE 295 03 816 U1 4/1995

OTHER PUBLICATIONS

Piotr Swiderski, European Search Report Mar. 19, 2008, Munich, Germany.
Annex to the European Search Report on European Patent Application No. EP 07 12 1412.

*Primary Examiner*—Edward Tso
*Assistant Examiner*—Aaron Piggush
(74) *Attorney, Agent, or Firm*—Michael Aronoff; Adan Ayala

(57) ABSTRACT

A cordless power tool system includes a power tool including with a motor disposed in the tool housing, and a variable speed circuit for controlling the speed of the motor. A power tool battery pack is electrically connectable to the power tool. The battery pack has an electric/electronic component connectable to the variable speed circuit. The variable speed circuit and/or the power tool are disabled if the variable speed circuit fails to detect the electric/electronic component.

6 Claims, 2 Drawing Sheets

BATTERY PACK LOCKOUT ARRANGEMENT FOR CORDLESS POWER TOOLS

FIELD

This specification relates to cordless power tools and more specifically to a lockout arrangement for locking out certain power tool battery packs from certain power tools.

BACKGROUND

Referring to FIGS. 1-2, a cordless power tool, such a drill 100, typically has a housing 101, a motor M for driving a cutting tool, such as drill bit DB, and a power tool battery pack 10 electrically connected to motor M. Drill 100 may have a variable speed feature allowing the user to select the rotational speed of motor M. Typically such variable speed feature is integrated into trigger assembly TA, allowing the user to adjust the desired speed by pulling trigger assembly TA a certain distance.

A typical power tool battery pack 10 has a housing 13, cells 11 disposed in the housing 13 and connected between first and second terminals A, B, and a thermistor 12 disposed in the housing 13 and connected between first and third terminals A, C. Such power tool battery pack 10 can be connected to drill 100 via terminals A, B.

Typically trigger assembly TA has a first switch S1, a second switch S2 and a potentiometer R1. Accordingly, when the operator closes the trigger assembly, first switch S1 closes, thereby powering up integrated circuit IC1. Integrated circuit IC1 is a device such as a 555timer, micro controller, or other device capable of controlling the voltage or current or power control to motor M. After first switch S1 is closed, potentiometer R1 provides a voltage signal to integrated circuit IC1 relative to trigger position. As the position of potentiometer R1 varies, the voltage presented to integrated circuit IC1 varies. Integrated circuit IC1 responds by activating FET Q1 with on/off pulses allowing current to flow from terminal A through switch S1 through motor M through FET Q1 (when FET Q1 is directed to be on by integrated circuit IC1). By directing FET Q1 on and off with a variable duty cycle, motor speed can be controlled. As previously stated, as the trigger assembly TA is fully engaged, FET Q1 is bypassed by second switch S2 allowing full connection to the power tool battery pack 10 for maximum power capability.

It is preferable to ensure that certain power tools can only be used with certain battery packs, and to lock out undesirable battery packs, which may not meet quality requirements, etc.

SUMMARY

A cordless power tool system comprising a power tool including a tool housing, a motor disposed in the tool housing, and a variable speed circuit for controlling the speed of the motor, and a power tool battery pack electrically connectable to the power tool, the power tool battery pack including a pack housing, cells disposed within the pack housing, and an electric/electronic component disposed within the pack housing and connectable to the variable speed circuit, wherein at least one of the variable speed circuit and the power tool is disabled if the variable speed circuit fails to detect the electric/electronic component.

BRIEF DESCRIPTION OF THE FIGURES

The accompanying drawings illustrate preferred embodiments according to the practical application of the principles thereof, and in which.

DETAILED DESCRIPTION

The present invention will now be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
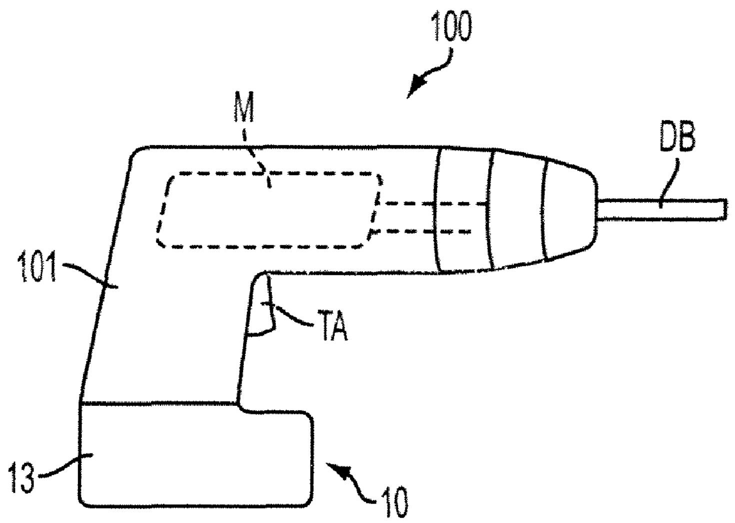
FIG. 1 illustrates a typical cordless power tool.
Figure 2:
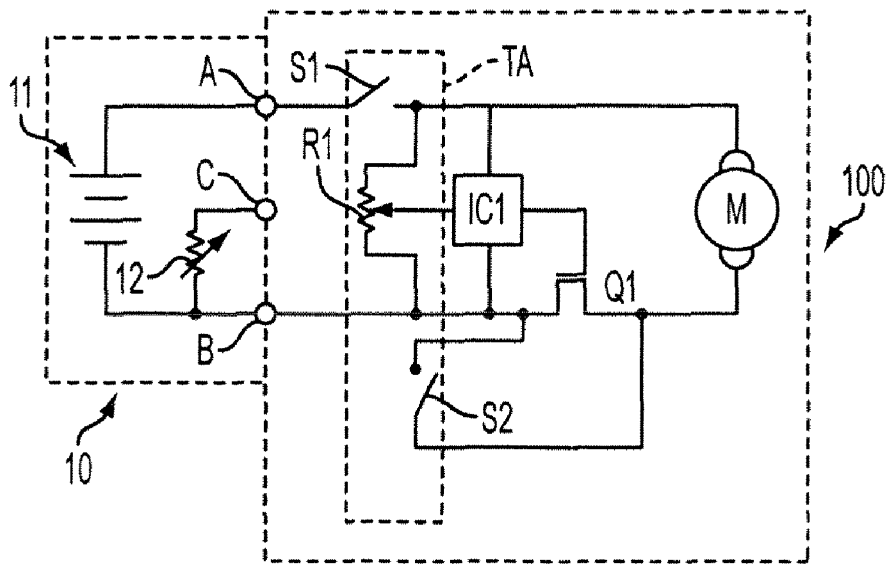
FIG. 2 PRIOR ART
FIG. 2 is a schematic diagram of the prior art power tool/power tool battery pack system.
Figure 3:
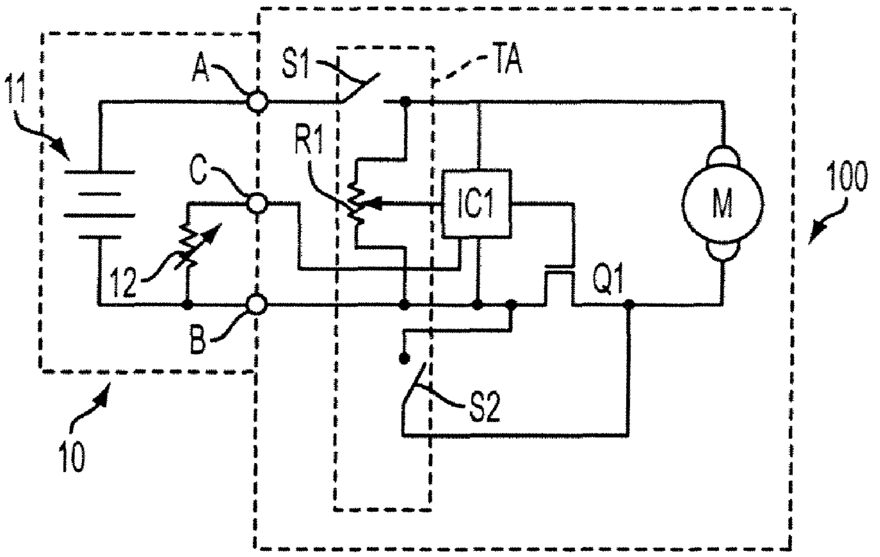
FIG. 3 is a schematic diagram of the power tool/power tool battery pack system according to the invention.

Referring first to FIGS. 1 and 3, where like numerals refer to like parts. A cordless power tool, such a drill 100, preferably has a housing 101, a motor M for driving a cutting tool, such as drill bit DB, and a power tool battery pack 10 electrically connected to motor M. Drill 100 may have a variable speed feature allowing the user to select the rotational speed of motor M. Typically such variable speed feature is integrated into trigger assembly TA, allowing the user to adjust the desired speed by pulling trigger assembly TA a certain distance.

Power tool battery pack 10 preferably has a housing 13, cells 11 disposed in the housing 13 and connected between first and second terminals A, B, and a thermistor 12 disposed in the housing 13 and connected between first and third terminals A, C. Such power tool battery pack 10 can be connected to drill 100 via terminals A, B.

Trigger assembly TA preferably has a first switch S1, a second switch S2 and a potentiometer R1. Accordingly, when the operator closes the trigger assembly, first switch S1 closes, thereby powering up integrated circuit IC1. Integrated circuit IC1 is a device such as a 555 timer, micro controller, or other device capable of controlling the voltage or current or power control to motor M. After first switch S1 is closed, potentiometer R1 provides a voltage signal to integrated circuit IC1 relative to trigger position. As the position of potentiometer R1 varies, the voltage presented to integrated circuit IC1 varies.

Integrated circuit IC1 is preferably connected to thermistor 12 via third terminal C. If integrated circuit IC1 does not detect thermistor 12, it will not turn on FET Q1, effectively disabling cordless drill 100. Alternatively, if integrated IC1 does not detect thermistor 12, it can just turn on FET Q1 full-time, effectively disabling the variable speed feature and the operator's ability to vary the speed of motor M. Disabling the variable speed feature may also be accomplished by never turning on FET Q1 such that the motor will only run full speed via closure of second switch S2. Alternately FET Q1 could be turned off and on in such a way to create an undesirable, counter-intuitive, or difficult to control behavior from the motor speed control.

On the other hand, if integrated circuit IC1 detects thermistor 12, it would activate FET Q1 with on/off pulses allowing current to flow from terminal A through switch S1 through motor M through FET Q1 (when FET Q1 is directed to be on by integrated circuit IC1). By directing FET Q1 on and off with a variable duty cycle, motor speed can be controlled. As previously stated, as the trigger assembly TA is fully engaged, FET Q1 is bypassed by second switch S2 allowing full connection to the power tool battery pack 10 for maximum power capability.

Persons skilled in the art will recognize that such arrangement can be used to render undesirable the use of power tool battery packs 10 that do not have a thermistor 12, thus encouraging operators to use power tool battery packs that have a thermistor 12. In addition, persons skilled in the art will recognize that thermistor 12 may replaced by other electric and/or electronic components, such as resistors, capacitors, inductors, transistors, integrated circuits, etc., which can be recognized by integrated circuit IC1.

Figure 4:
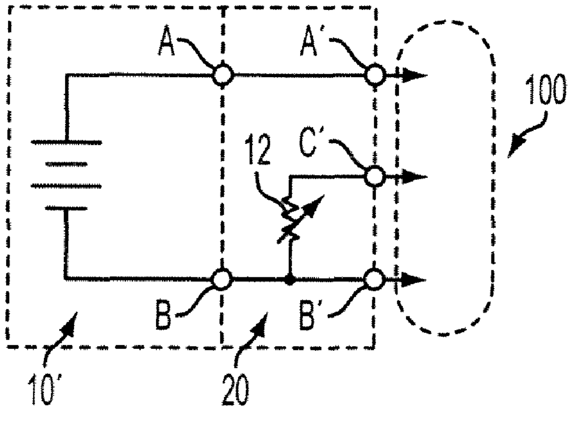
FIG. 4 is a partial schematic diagram of the power tool/adapter/power tool battery pack system according to the invention.

A second embodiment of the present invention is shown in FIG. 4, where like numerals refer to like parts. All the teachings of the first embodiment discussed above are incorporated herein by reference. The only difference between the first and second embodiments is that an adapter 20 is disposed on battery pack 10 and/or cordless drill 100. Persons skilled in the art are referred to U.S. Pat. No. 6,525,511, which is fully incorporated herein by reference, for further information on adapter 20.

Adapter 20 may interface one type of power tool battery pack with a cordless drill 100 that accepts a different type of power tool battery pack. For example, adapter 20 may interface a tower-style power tool battery pack with a cordless drill 100 that accepts only slide-style power tool battery packs, and/or a tower-style power tool battery pack having a first terminal configuration with a cordless drill 100 that accepts only tower-style power tool battery packs having a second terminal configuration, where the cordless drill 100 would not accept the power tool battery pack having the first terminal configuration.

Adapter 20 may also interface a power tool battery pack 10' that does not have a thermistor 12 with a cordless drill 100 that requires the presence of thermistor 12 in order to activate cordless drill 100 and/or the variable speed circuit. Such result can be accomplished as follows. Adapter 20 may be electrically connected to power tool battery pack 10 via first and second terminals A, B. Adapter 20 may in turn have third and fourth terminals A', B' that electrically connect to cordless drill 100, in the same manner the first and second (power) terminals A,B would have been connected to cordless drill 100.

In addition, adapter 20 may have a fifth terminal C', and a thermistor 12 connected to such terminal C'. Terminal C' would preferably be connected to cordless drill 100 so that the presence of thermistor 12 could be detected by integrated circuit IC1.

Persons skilled in the art will recognize that if an adapter 20 lacking thermistor 12 is used to interface power tool battery pack 10' with cordless drill 100, integrated circuit IC1 cannot detect a thermistor 12. Thus, integrated circuit IC1 will not turn on FET Q1 in a desirable manner, effectively disabling cordless drill 100, or turn on FET Q1 full-time, effectively disabling the variable speed feature and the operator's ability to vary the speed of motor M.

It should be understood that the adapter preferably acts as a pass-through for battery terminals A and B to connect the battery and terminal to the power tool motor. Adapter 20 may also have a pass-through terminal for a thermistor in battery pack 10.

Alternately instead of passing through the thermistor signal, the adapter 20 may not pass through the thermistor signal by not connecting to the thermistor terminal in battery pack 10 or terminating such line within the adapter 20. Rather the connection to the integrated circuit IC1 could be made by an electronic/electrical element in the adapter 20 itself (taking the place of the thermistor in the battery pack 10) thereby impersonating the thermistor lock-out feature of the circuit. The electronic/electrical element could be a thermistor, resistor, or other element that would signal the variable speed circuit to operate in a normally desirable manner.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A cordless power tool system comprising:

a power tool comprising a tool housing, a motor disposed in the tool housing, and a variable speed circuit for controlling the speed of the motor, and a power tool battery pack electrically connectable to the power tool, the power tool battery pack comprising a pack housing, cells disposed within the pack housing, wherein the power tool is configured to determine if a component, the component connectable to the variable speed circuit, is present in the battery pack and if the power tool determines that the component is not present in the battery pack then, although the battery pack provides power to the power tool the variable speed circuit is disabled.

2. The power tool system of claim 1, wherein the component is a thermistor.

3. The power tool system of claim 1, wherein the component is a resistor.

4. A power tool comprising:

a tool housing, a motor disposed in the tool housing, a control circuit disposed in the tool housing for controlling the motor, and terminals electrically connected to the motor for connecting to a power tool battery pack, the power tool battery pack comprising a pack housing, cells disposed within the pack housing, wherein the control circuit is configured to determine if a component, the component connectable to the control circuit, is present in the battery pack and if the control circuit determines that the component is not present in the battery pack then, although the battery pack provides power to the power tool power is not provided to the motor.

5. The power tool of claim 4, wherein the component is a thermistor.

6. The adapter of claim 4, wherein the component is a resistor.

* * * * *